(12) United States Patent
Zhang et al.

(10) Patent No.: US 10,194,338 B2
(45) Date of Patent: Jan. 29, 2019

(54) NETWORK OPTIMIZATION METHOD AND APPARATUS, AND BASE STATION

(71) Applicant: HUAWEI TECHNOLOGIES CO., LTD., Shenzhen, Guangdong (CN)

(72) Inventors: Jietao Zhang, Shenzhen (CN); Hongcheng Zhuang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 11 days.

(21) Appl. No.: 15/411,006

(22) Filed: Jan. 20, 2017

(65) Prior Publication Data

US 2017/0134970 A1 May 11, 2017

Related U.S. Application Data

(63) Continuation of application No. PCT/CN2014/082624, filed on Jul. 21, 2014.

(51) Int. Cl.
*H04W 24/02* (2009.01)
*H04W 28/08* (2009.01)
(Continued)

(52) U.S. Cl.
CPC ............ *H04W 24/02* (2013.01); *H04L 47/29* (2013.01); *H04W 24/08* (2013.01); *H04W 24/10* (2013.01);
(Continued)

(58) Field of Classification Search
None
See application file for complete search history.

(56) References Cited

U.S. PATENT DOCUMENTS 7,173,904 B1 * 2/2007 Kim ................. H04W 72/0486
370/230
2011/0096687 A1 * 4/2011 Dottling ................ H04W 24/02
370/252
(Continued)

FOREIGN PATENT DOCUMENTS

CN 101534536 A 9/2009
CN 101572919 A 11/2009
(Continued)

OTHER PUBLICATIONS

International Search Report dated Apr. 3, 2015 in corresponding International Application No. PCT/CN2014/082624.
(Continued)

*Primary Examiner* — Eunsook Choi
(74) *Attorney, Agent, or Firm* — Staas & Halsey LLP

(57) ABSTRACT

Embodiments of the present invention disclose a network optimization method and apparatus, and a base station. The method includes: collecting statistics on a load index of a cell within a coverage area; determining a load level of the cell according to the load index of the cell; obtaining a network key performance indicator of the cell; determining a performance status of the cell according to the load index and the network key performance indicator of the cell; determining a cause for overload of the cell according to the performance status of the cell when the load level of the cell is overload; and sending a message to a self-organized network SON entity, where the message carries an identifier that is used to indicate the cause for overload of the cell.

10 Claims, 3 Drawing Sheets

(51) Int. Cl.
  *H04W 24/08* (2009.01)
  *H04W 24/10* (2009.01)
  *H04W 28/02* (2009.01)
  *H04L 12/801* (2013.01)

(52) U.S. Cl.
  CPC ... *H04W 28/0205* (2013.01); *H04W 28/0236* (2013.01); *H04W 28/0268* (2013.01); *H04W 28/0284* (2013.01); *H04W 28/08* (2013.01)

(56) References Cited

U.S. PATENT DOCUMENTS

| | | | | |
|---|---|---|---|---|
| 2012/0302213 A1* | 11/2012 | Shu | | H04W 36/12 455/411 |
| 2013/0023217 A1* | 1/2013 | Zhuang | | H04W 24/02 455/63.1 |
| 2013/0137478 A1* | 5/2013 | Szufarska | | H04W 52/143 455/522 |
| 2016/0165478 A1* | 6/2016 | Yao | | H04L 41/0823 370/236 |
| 2017/0006498 A1* | 1/2017 | Matas Sanz | | H04W 28/08 |

FOREIGN PATENT DOCUMENTS

| | | |
|---|---|---|
| CN | 102037768 A | 4/2011 |
| CN | 102118797 A | 7/2011 |
| CN | 103237328 A | 8/2013 |
| WO | 2013/066123 A1 | 5/2013 |
| WO | 2013098559 A1 | 7/2013 |

OTHER PUBLICATIONS

Office Action, dated Sep. 5, 2018, in Chinese Application No. 201480052847.2 (5 pp.).

* cited by examiner

NETWORK OPTIMIZATION METHOD AND APPARATUS, AND BASE STATION

CROSS-REFERENCE TO RELATED APPLICATIONS

This application is a continuation of International Application No. PCT/CN2014/082624, filed on Jul. 21, 2014, the disclosure of which is hereby incorporated by reference in its entirety.

TECHNICAL FIELD

The present invention relates to the field of communications technologies, and in particular, to a network optimization method and apparatus, and a base station.

BACKGROUND

Long Term Evolution (LTE) is a Universal Mobile Telecommunications System (UMTS) technical standard formulated by The 3rd Generation Partnership Project (3GPP) organization. An LTE access network load is defined as an occupancy rate of Physical Resource Block (PRB); a higher occupancy rate indicates a higher air interface load. When an air interface is overloaded, a s Self-Organized Network (SON)/Radio Resource Management (RRM) entity of a base station needs to apply a given policy to perform network optimization, so as to meet service requirements of users.

In the prior art, when a base station detects an excessively high air interface load, a SON entity proactively triggers a load balancing operation, and hands over cell edge users to a neighboring cell with a lower load, thereby reducing a cell load and improving cell performance. However, in this solution, a cause for overload cannot be distinguished when a cell is overloaded. There may be many causes for cell overload. For example: (1) When a cell has an excessively high service requirement, a PRB quantity in the service requirement exceeds a quantity of resources of a base station, resulting in system overload; (2) When a Signal to Noise Ratio (SNR) of a received signal is quite low for a large quantity of users in a cell, even if a service requirement is not high, system overload may be caused by the fact that due to poor channel quality, more resources than available PRB resources of a base station are needed to meet the service requirement; (3) When a Signal to Interference Ratio (SIR) is very low because a large quantity of users in a cell are interfered, even if a service requirement is not high, system overload may be caused by the fact that due to poor channel quality, more resources than available PRB resources of a base station are needed to meet the service requirement; and (4) It should also be considered that because resource usage features for a Guaranteed Bit Rate (GBR) service and a None Guaranteed Bit Rate (NGBR) service are different, different service types have different effects on a cell load. As a result, simply performing a load balancing optimization operation cannot effectively improve a load status of an overloaded cell in many scenarios. For example, for cell overload caused by interference from a neighboring cell, if some users are handed over to the neighboring cell, the other users in the cell are interfered with by the neighboring cell more seriously. For another example, when there are many cell center users and few cell edge users, cell overload is mainly caused by a large quantity of service requirements of the cell center users; therefore, if the cell edge users are handed over to a neighboring cell only by means of load balancing, a load status of the cell cannot be effectively improved either.

SUMMARY

In view of this, embodiments of the present invention provide a network optimization method and apparatus, and a base station, where a cause for overload of a cell can be determined, so as to quickly identify a network problem, and trigger a SON entity to dynamically select an optimization policy according to the cause for overload, accurately and effectively resolving a cell overload problem.

According to a first aspect, an embodiment of the present invention provides a network optimization method, where the method includes:

collecting statistics on a load index of a cell within a coverage area;

determining a load level of the cell according to the load index of the cell;

obtaining a network key performance indicator of the cell;

determining a performance status of the cell according to the load index and the network key performance indicator of the cell;

determining a cause for overload of the cell according to the performance status of the cell when the load level of the cell is overload; and sending a message to a self-organized network SON entity, where the message carries an identifier that is used to indicate the cause for overload of the cell.

In a first possible implementation manner, the load index of the cell specifically includes a load ratio and a dynamic load ratio, and the determining a load level of the cell according to the load index of the cell is specifically:

when the load ratio exceeds an upper threshold of the load ratio and the dynamic load ratio exceeds an upper threshold of the dynamic load ratio, determining that the load level of the cell is overload.

In a second possible implementation manner, the determining a performance status of the cell according to the load index and the network key performance indicator of the cell is specifically:

determining the cell performance indicator according to the load index and the network key performance indicator of the cell, where the cell performance indicator includes a load feature parameter and a spectrum efficiency feature parameter of the cell; and determining the performance status of the cell according to the cell performance indicator.

With reference to the second possible implementation manner of the first aspect, in a third possible implementation manner, the determining a cause for overload of the cell according to the performance status of the cell when the load level of the cell is overload is specifically:

determining the cause for overload of the cell according to the load feature parameter and the spectrum efficiency feature parameter of the cell.

With reference to the first aspect, or the first, the second, or the third possible implementation manner of the first aspect, in a fourth possible implementation manner, the network key performance indicator includes a cell average efficiency CAE, which is used to indicate a resource usage capability of the cell; and $$CAE = \frac{\sum_{n=1}^{N} MCS_n}{N * MCS_{max}},$$

where MCS is a modulation and coding scheme used for a resource block according to channel quality of a scheduled user; and N is a quantity of users within the cell.

With reference to the first aspect, or the first, the second, or the third possible implementation manner of the first aspect, in a fifth possible implementation manner, the network key performance indicator includes a cell edge load ratio CELR, which is used to indicate a percentage that user services at the edge of the cell account for in services in the cell; and $$CELR = \frac{\text{Load of a user } thatsatisfiesan\ A2event}{\text{Loads of all users}},$$

where the user that satisfies an A2 event is a user receiving a base station signal whose strength is lower than a specified threshold.

According to a second aspect, an embodiment of the present invention provides a network optimization apparatus, including:

a statistics collecting unit, configured to collect statistics on a load index of a cell within a coverage area;

a processing unit, configured to determine a load level of the cell according to the load index of the cell;

an obtaining unit, configured to obtain a network key performance indicator of the cell, where the processing unit is further configured to determine a performance status of the cell according to the load index and the network key performance indicator of the cell;

a determining unit, configured to determine a cause for overload of the cell according to the performance status of the cell when the load level of the cell is overload; and a sending unit, configured to send a message to a self-organized network SON entity, where the message carries an identifier that is used to indicate the cause for overload of the cell.

In a first possible implementation manner, the load index of the cell specifically includes a load ratio and a dynamic load ratio, and the processing unit includes:

a first processing unit, configured to: when the load ratio exceeds an upper threshold of the load ratio and the dynamic load ratio exceeds an upper threshold of the dynamic load ratio, determine that the load level of the cell is overload.

In a second possible implementation manner, the processing unit includes:

a second processing unit, configured to: determine the cell performance indicator according to the load index and the network key performance indicator of the cell, where the cell performance indicator includes a load feature parameter and a spectrum efficiency feature parameter of the cell; and determine the performance status of the cell according to the cell performance indicator.

With reference to the second possible implementation manner of the second aspect, in a third possible implementation manner, the determining unit is specifically configured to:

determine the cause for overload of the cell according to the load feature parameter and the spectrum efficiency feature parameter of the cell.

With reference to the second aspect, or the first, the second, or the third possible implementation manner of the second aspect, in a fourth possible implementation manner, the network key performance indicator includes a cell average efficiency CAE, which is used to indicate a resource usage capability of the cell; and $$CAE = \frac{\sum_{n=1}^{N} MCS_n}{N * MCS_{max}},$$

where MCS is a modulation and coding scheme used for a resource block according to channel quality of a scheduled user; and N is a quantity of users within the cell.

With reference to the second aspect, or the first, second, or the third possible implementation manner of the second aspect, in a fifth possible implementation manner, the network key performance indicator includes a cell edge load ratio CELR, which is used to indicate a percentage that user services at the edge of the cell account for in services in the cell; and $$CELR = \frac{\text{Load of a user } thatsatisfiesan\ A2event}{\text{Loads of all users}},$$

where the user that satisfies an A2 event is a user receiving a base station signal whose strength is lower than a specified threshold.

According to a third aspect, an embodiment of the present invention provides a base station, including:

a processor, configured to execute an application program stored in a memory; the memory, configured to store the application program, where the application program includes instructions that may be used to enable the processor to execute the following process:

collecting statistics on a load index of a cell within a coverage area; determining a load level of the cell according to the load index of the cell;

obtaining a network key performance indicator of the cell;

determining a performance status of the cell according to the load index and the network key performance indicator of the cell;

determining a cause for overload of the cell according to the performance status of the cell when the load level of the cell is overload; and a network interface, configured to send a message to a self-organized network SON entity, where the message carries an identifier that is used to indicate the cause for overload of the cell.

In a first possible implementation manner, the load index of the cell specifically includes a load ratio and a dynamic load ratio, and an instruction that is in the application program and that may be used to enable the processor to execute the determining a load level of the cell according to the load index of the cell is:

when the load ratio exceeds an upper threshold of the load ratio and the dynamic load ratio exceeds an upper threshold of the dynamic load ratio, determining that the load level of the cell is overload.

In a second possible implementation manner, instructions that are in the application program and that may be used to enable the processor to execute the determining a performance status of the cell according to the load index and the network key performance indicator of the cell are:

determining the cell performance indicator according to the load index and the network key performance indicator of the cell, where the cell performance indicator includes a load feature parameter and a spectrum efficiency feature parameter of the cell; and determining the performance status of the cell according to the cell performance indicator.

With reference to the second possible implementation manner of the third aspect, in a third possible implementation manner, an instruction that is in the application program and that may be used to enable the processor to execute the determining a cause for overload of the cell according to the performance status of the cell when the load level of the cell is overload is:

determining the cause for overload of the cell according to the load feature parameter and the spectrum efficiency feature parameter of the cell.

With reference to the third aspect, or the first, the second, or the third possible implementation manner of the third aspect, in a fourth possible implementation manner, the network key performance indicator includes a cell average efficiency CAE, which is used to indicate a resource usage capability of the cell; and $$CAE = \frac{\sum_{n=1}^{N} MCS_n}{N * MCS_{max}},$$

where MCS is a modulation and coding scheme used for a resource block according to channel quality of a scheduled user; and N is a quantity of users within the cell.

With reference to the third aspect, or the first, the second, or the third possible implementation manner of the third aspect, in a fifth possible implementation manner, the network key performance indicator includes a cell edge load ratio CELR, which is used to indicate a percentage that user services at the edge of the cell account for in services in the cell; and $$CELR = \frac{\text{Load of a user } thatsatisfiesan\ A2event}{\text{Loads of all users}},$$

where the user that satisfies an A2 event is a user receiving a base station signal whose strength is lower than a specified threshold.

According to the network optimization method and apparatus, and the base station that are provided by the embodiments of the present invention, whether a cell is overloaded is determined according to a load index of the cell, a performance status of the cell is identified with reference to a network key performance indicator, and a cause for overload of the cell is determined if a cell load is overload. Therefore, a network problem is quickly identified, and a SON entity is triggered to dynamically select an optimization policy according to the cause for overload, accurately and effectively resolving a cell overload problem.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

The following further describes the technical solutions of the present invention in detail with reference to the accompanying drawings and the embodiments.

DESCRIPTION OF EMBODIMENTS

The following describes the embodiments of the present invention in detail with reference to the accompanying drawings. It should be clear that the described embodiments are merely some but not all of the embodiments of the present invention. All other embodiments obtained by a person of ordinary skill in the art based on the embodiments of the present invention without creative efforts shall fall within the protection scope of the present invention.

A network optimization method in the present invention may be applied to an LTE system or other various mobile communications systems. The system includes a base station, a cell within a coverage area of the base station, and a SON entity. The base station includes an RRM entity; the SON entity is a logical entity and may exist in the base station or an independent controller or another physical entity. For a case in which a cell has an excessively high load in different scenarios, the embodiments of the present invention provide a solution in which the SON entity can execute a dynamic optimization policy according to different causes for overload.

Figure 1:
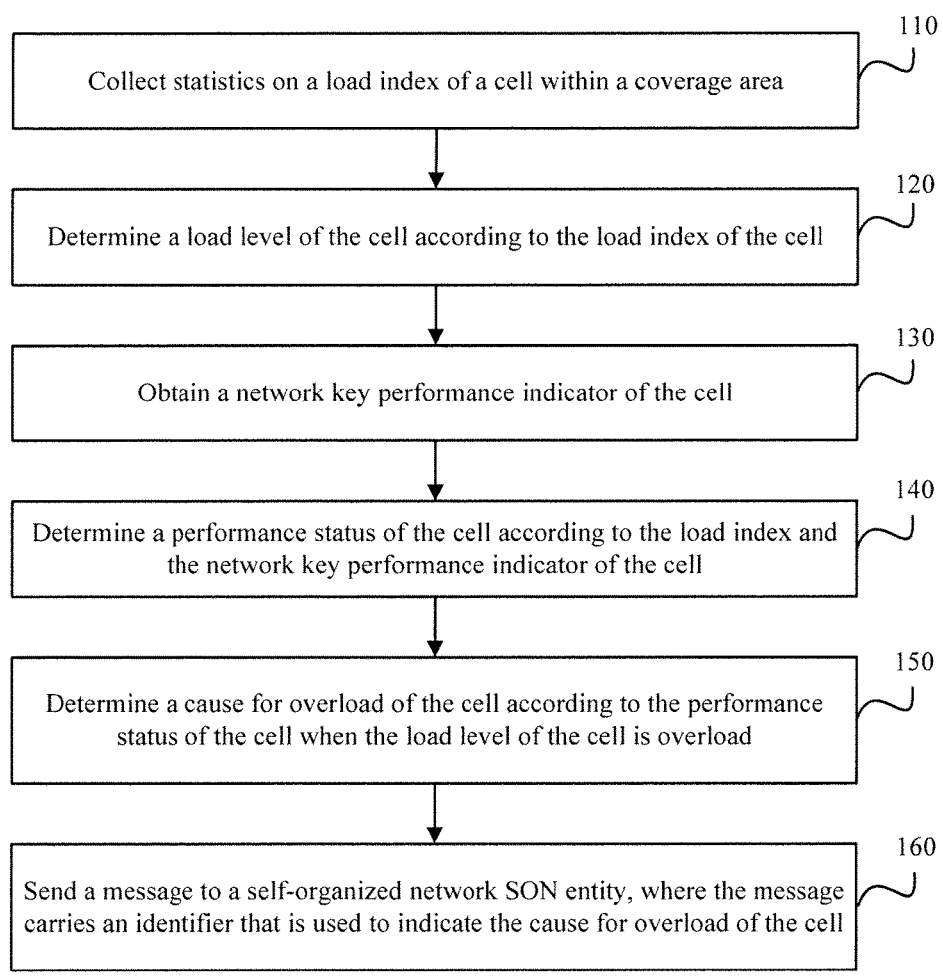
FIG. 1 is a flowchart of a network optimization method according to an embodiment of the present invention.

Embodiment 1 of the present invention provides a network optimization method, and FIG. 1 is a flowchart of the network optimization method according to this embodiment of the present invention. In this embodiment, the method is executed by a base station. The base station may include one or more cells, where when multiple cells are included, generally three cells are included. The network optimization method provided by this embodiment of the present invention is executed for each cell.

Step 110: The base station collects statistics on a load index of a cell within a coverage area of the base station.

Specifically, the base station collects statistics on a load index of each cell separately within the coverage area of the base station. According to an LTE specification, a Load Ratio (LR) of the cell can be obtained through calculation by using the following formula:

$$LR = \frac{\text{Quantity of } PRBs\ occupiedby\text{ a } GBR \text{ service} + \text{Quantity of } PRBs\ occupiedby\text{ an } NGBR \text{ service}}{Quantity of\ availablePRBs} \quad \text{(Formula 1)}$$

A quantity of PRBs occupied by a GBR service and an NGBR service may be a quantity of PRBs occupied by an uplink service or a downlink service, or may be a quantity of PRBs occupied by both an uplink service and a downlink service. Correspondingly, a quantity of available PRBs of the cell may be a quantity of available PRBs of an uplink or a downlink, or may be a quantity of available PRBs of both an uplink and a downlink. Two thresholds, a maximum load threshold $LR_{MAX}$ and a minimum load threshold $LR_{MIN}$, are defined. $LR \leq LR_{MIN}$ indicates that the cell is in a low load state; $LR > LR_{MAX}$ indicates that the cell is in a high load state, and in this case, whether a system can provide access to more services depends on another load index, for example, a Dynamic Load Ratio (DLR); $LR_{MIN} < LR \leq LR_{MAX}$ indicates that the cell is in a normal load state.

In an LTE system, system resource usage features for the GBR service and the NGBR service are different. For the GBR service, the system needs to ensure that a corresponding service request resource is provided to enable normal running of the GBR service. If a system resource cannot meet a requirement of the GBR service, the GBR service is interrupted. The NGBR is a resilient service. The NGBR service can run normally provided that the system can provide a resource that meets a minimum service Quality of Experience (QoE) requirement of the NGBR service. The system may allocate more resources to the NGBR service according to an Aggregated Maximum Bit Rate (AMBR) condition if resources are sufficient, or the system may allocate fewer resources to the NGBR service if resources are insufficient. Therefore, a service load that needs to meet the requirement may be represented by defining a Dynamic Load Ratio, (DLR). The DLR is calculated according to the following formula:

$$DLR = \frac{\text{Quantity of } PRBs \text{ requried for a } GBR \text{ service} + \text{Quantity of } PRBs \text{ required for a minimum } QoE \text{ of an } NGBR \text{ service}}{\text{Quantity of available } PRBs} \quad \text{(Formula 2)}$$

Two thresholds, $DLR_{MAX}$ and $DLR_{MIN}$, are defined. $DLR \leq DLR_{MIN}$ indicates that the cell is in a low load state. $DLR > DLR_{MAX}$ indicates that the cell is in a high load state, and a system load has reached a critical state; in this case, a system capacity is basically saturated and the system is difficult to provide access to more services. When $LR > LR_{MAX}$ and $DLR \leq DLR_{MAX}$, the system is in the high load state, but the system load has not reached the critical state; therefore, the system may further provide access to more GBR services by decreasing an NGBR service ratio of an accessed user. $DLR_{MIN} < DLR \leq DLR_{MAX}$ indicates that the cell is in a normal load state.

Therefore, the load index, on which statistics are collected by the base station, of the cell may include two parameters: the LR and the DLR.

Step 120: Determine a load level of the cell according to the load index of the cell.

Specifically, a load status of the cell is determined and detected according to the LR and the DLR that are obtained by means of statistics collection in step 110. When $LR > LR_{MAX}$, it indicates that the cell is in the high load state, and whether the cell is overloaded needs to be further determined. In this case, whether the DLR exceeds the threshold $DLR_{MAX}$ needs to be determined. If $DLR \leq DLR_{MAX}$, the cell load is in the high load state, but has not reached the critical state, that is, the cell is not overloaded. If $DLR > DLR_{MAX}$, it is determined that the cell load is in an overload state.

Step 130: Obtain a network key performance indicator of the cell.

Specifically, the Key Performance Indicator (KPI) of the cell includes parameters such as a Cell Average Efficiency (CAE) and a Cell Edge Load Ratio (CELR).

The Cell Average Efficiency (CAE) is a performance indicator representing a resource usage capability of the cell. In the LTE system, a different Modulation and Coding Scheme (MCS) is used for a different resource block according to channel quality of a scheduled user. A higher MCS used indicates higher usage efficiency of a resource block; otherwise, a lower MCS used indicates lower usage efficiency of a resource block. The CAE may be calculated by using the following formula:

$$CAE = \frac{\sum_{n=1}^{N} MCS_n}{N * MCS_{max}} \quad \text{(Formula 3)}$$

where N represents a user quantity in a cell.

$CAE_{MIN}$ is a minimum cell average efficiency threshold. When $CAE \geq CAE_{MIN}$, it indicates that the cell average efficiency is in a normal range; when $CAE < CAE_{MIN}$, it indicates that the cell average efficiency is quite low and cell resource usage efficiency is low.

There are mainly two factors causing a decrease in the cell average efficiency. First, when the cell is strongly interfered, average channel quality of cell users is relatively poor, resulting in that the cell resource usage efficiency is not high. Second, when most users in the cell are located at the edge of the cell, average channel quality of cell users is also relatively poor, resulting in that the cell resource usage efficiency is not high. To distinguish the low cell average efficiency caused in the two cases, the CELR is defined and used to indicate a percentage that user services at the edge of the cell account for in services in the cell. The CELR is calculated by using the following formula:

$$CELR = \frac{\text{Load of a user } that satisfies an A2 event}{\text{Loads of all users}} \quad \text{(Formula 4)}$$

According to a definition in a specification document 3GPP TS36.331, the user that satisfies an A2 event is a user receiving a serving base station signal whose strength is lower than a specified threshold. $CELR_{MAX}$ is a maximum cell edge load ratio threshold. When $CELR > CELR_{MAX}$, it indicates that there is a large quantity of user services at the edge of the cell. Received signals of these users are relatively low; therefore, service communication can be performed only by using a low order modulation and coding scheme, which directly results in low cell average efficiency. When $CELR \leq CELR_{MAX}$, it indicates that user services are relatively evenly distributed, which does not result in low cell average efficiency.

Step 140: Determine a performance status of the cell according to the load index and the network key performance indicator of the cell.

Specifically, the performance status of the cell is detected according to the LR and the DLR that are obtained by means of statistics collection in step 110 and the CAE and the CELR that are obtained in step 130, which specifically includes the following steps:

Step 141: Determine the cell performance indicator according to the load index and the network key performance indicator of the cell, where the cell performance indicator includes a load feature parameter and a spectrum efficiency feature parameter of the cell.

In this embodiment, a relationship between the load index and the network key performance indicator that are of the cell and the load feature parameter and the spectrum efficiency feature parameter that are of the cell is defined as follows, as shown in Table 1.

TABLE 1

| Performance indicator serial number (PI ID) | Cell performance indicator (Cell Performance Indicator) | Cell parameter | | | |
|---|---|---|---|---|---|
| | | LR | DLR | CAE | CELR |
| | Performance (Performance) | | | | |
| 1 | Normal performance (Normal Performance) Load (Load) | >MIN & ≤MAX | / | ≥MIN | / |
| 2 | High load (High load) | >MAX | ≤MAX | / | / |
| 3 | Critical load (Critical load) | >MAX | >MAX | / | / |
| | Spectrum efficiency (Efficiency) | | | | |
| 4 | Low efficiency-interference limited (Low Efficiency-Interference Limited) | / | / | <MIN | ≤MAX |
| 5 | Low efficiency-noise limited (Low Efficiency-Noise Limited) | / | / | <MIN | >MAX |
| 6 | Low utilization (Low Utilization) | ≤MIN | / | / | <MAX |

It can be seen that: when $LR_{MIN}<LR\leq LR_{MAX}$ and $CAE>CAE_{MIN}$, it indicates that the cell works in a normal state; when $LR\geq LR_{MAX}$ and $DLR\leq DLR_{MAX}$, it indicates that the cell is in the high load state, but has not reached the critical load state; when $LR\geq LR_{MAX}$ and $DLR\geq DLR_{MAX}$, it indicates that the cell is in the critical load state; in this case, the system capacity has been saturated and the system needs to decrease the cell load through optimization; when $CAE<CAE_{MIN}$ and $CELR<CEL_{MAX}$, it indicates that the cell average efficiency is low, and the main cause for an excessively low cell efficiency is interference; when $CAE<CAE_{MIN}$ and $CELR>CELR_{MAX}$, it indicates that the cell average efficiency is low, and the main cause for an excessively low cell efficiency is coverage; and the like. Details are shown in the foregoing table and not described one by one.

Step 142: Determine the performance status of the cell according to the load feature parameter and the spectrum efficiency feature parameter of the cell.

Specifically, after a load feature and a spectrum efficiency feature of the cell are determined, the performance status of the cell is further determined according to the cell performance indicator that is determined according to the performance indicators LR, DLR, CAE and CELR. Details are shown in Table 2. In the following table, 1 to 6 in the performance indicator serial number (PI ID) respectively correspond to 1 to 6 in the performance indicator serial number (PI ID) in Table 1. When a status is 1, it indicates that the cell is in a corresponding cell performance indicator (for details, refer to Table 1), and when a status is 0, it indicates that the cell is not in this status.

TABLE 2

| Input | | | | | | Status grade | |
|---|---|---|---|---|---|---|---|
| Performance indicator ID (PI ID) | | | | | | | Cell performance status number |
| 1 | 2 | 3 | 4 | 5 | 6 | Cell performance status information | (ID) |
| 1 | / | / | / | / | / | Normal | 1 |
| / | 0 | 0 | 1 | 0 | 0 | High interference | 2 |
| / | 0 | 0 | 0 | 1 | 0 | Low coverage (low signal to noise ratio) | 3 |
| / | 1 | 0 | 0 | 0 | 0 | High load | 4 |
| / | 1 | 0 | 1 | 0 | 0 | High load (high interference) | 5 |
| / | 1 | 0 | 0 | 1 | 0 | High load (low signal to noise ratio) | 6 |
| / | 0 | 1 | 0 | 0 | 0 | Critical load | 7 |
| / | 0 | 1 | 1 | 0 | 0 | Critical load (high interference) | 8 |
| / | 0 | 1 | 0 | 1 | 0 | Critical load (low signal to noise ratio) | 9 |
| / | / | / | / | / | 1 | Low operation grade (Low Operation Grade) | 10 |

It can be seen that, when cell performance status numbers correspond to 7, 8 and 9, the cell is in the critical load state, that is, the overload state.

Step 150: Determine a cause for overload of the cell according to the performance status of the cell when the load level of the cell is overload.

When ID=7 (that is, a case in which a load feature in the cell performance indicator is determined as an critical load according to the load index of the cell), the cell is correspondingly in the critical load state, and the critical load is mainly caused by an excessively high service requirement. When ID=8 (that is, a case in which a load feature in the cell performance indicator is determined as a critical load according to the load index of the cell and a spectrum efficiency feature of the cell is determined, according to the network key performance indicator of the cell, as low efficiency-interference limited), the cell is correspondingly in the critical load state, and the critical load is mainly caused by excessively high interference to the cell users. When ID=9 (that is, a case in which a load feature in the cell performance indicator is determined as a critical load according to the load index of the cell and a spectrum efficiency feature of the cell is determined, according to the network key performance indicator of the cell, as low efficiency-noise limited), the cell is correspondingly in the critical load state, and the critical load is mainly caused by poor coverage of the cell.

If the load level of the cell is not overload, step 110 may be returned and executed.

After the cause for overload of the cell is determined, cell performance may be further optimized according to the cause for overload.

Step 160: Send a message to a self-organized network SON entity, where the message carries an identifier that is used to indicate the cause for overload of the cell.

Specifically, the base station sends the message to the SON entity, where the message carries the identifier indicating the cause for overload. In this case, the SON entity selects, according to the cause for overload obtained in the identifier, an appropriate optimization algorithm to optimize network performance. The SON entity is a logical entity and may exist in the base station or an independent controller.

In a specific example, a schematic information exchange diagram of an optimization method is shown in Table 3.

TABLE 3

| Cause for overload | Optimization manner |
| --- | --- |
| Interference | Using an ICIC optimization algorithm |
| Coverage | Using an RF optimization algorithm |
| Service requirement | Using an RF and/or LB optimization algorithm |

It can be seen from Table 3 that: when the cause for overload is interference, the SON entity triggers an Inter-Cell Interference Coordination (ICIC) optimization algorithm to optimize the network performance; when the cause for overload is coverage, the SON entity triggers a r Radio Frequency (RF) optimization algorithm to optimize the network performance; when the cause for overload is an excessively high service requirement, the SON entity triggers an RF optimization algorithm and/or a Load Balancing (LB) optimization algorithm to optimize the network performance. The foregoing table lists only examples of optimization manners that may be used for several causes, while optimization algorithms that may be used in the network optimization method provided by this embodiment of the present invention are not limited to the foregoing examples.

According to the network optimization method provided by this embodiment of the present invention, whether a cell is overloaded is determined according to a load index of the cell, a performance status of the cell is identified with reference to a network key performance indicator, and a cause for overload of the cell is determined if a cell load is overload. Therefore, a network problem is quickly identified, and a SON entity is triggered to dynamically select an optimization policy according to the cause for overload, accurately and effectively resolving a cell overload problem.

Figure 2:
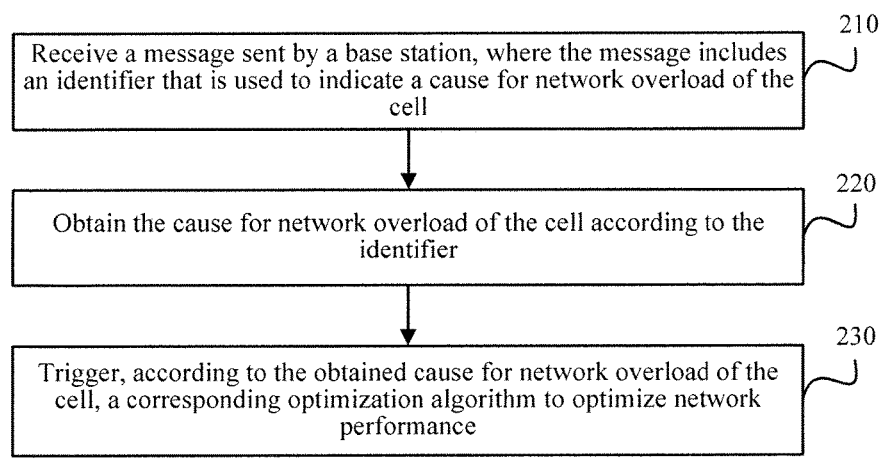
FIG. 2 is a flowchart of a network optimization method according to an embodiment of the present invention.

Correspondingly, Embodiment 2 of the present invention further provides another network optimization method, and the method is executed by the SON entity in step 160. As shown in FIG. 2, the method includes the following steps:

Step 210: Receive a message sent by a base station, where the message includes an identifier that is used to indicate a cause for network overload of a cell.

Step 220: Obtain the cause for network overload of the cell according to the identifier.

The network overload of the cell may be mainly caused by an excessively high service requirement, or by excessively high interference to the cell, or by poor coverage of the cell.

Specifically, for related descriptions on the cause for network overload of the cell, specifically refer to the descriptions of step 140 and step 150 in the foregoing embodiment.

Step 230: Trigger, according to the obtained cause for network overload of the cell, a corresponding optimization algorithm to optimize network performance.

When the cause for overload is interference, the SON entity triggers an ICIC optimization algorithm to optimize the network performance. When the cause for overload is coverage, the SON entity triggers an RF optimization algorithm to optimize the network performance. When the cause for overload is an excessively high service requirement, the SON entity triggers the RF optimization algorithm and/or an LB optimization algorithm to optimize the network performance.

According to the network optimization method provided by this embodiment of the present invention, an identifier, sent by a base station, for indicating a cause for network overload of a cell is received, so as to determine a cause for overload of the cell. Therefore, a network problem is quickly identified, an optimization policy is dynamically selected according to the cause for overload, and network optimization is triggered, accurately and efficiently resolving a cell overload problem.

Figure 3:
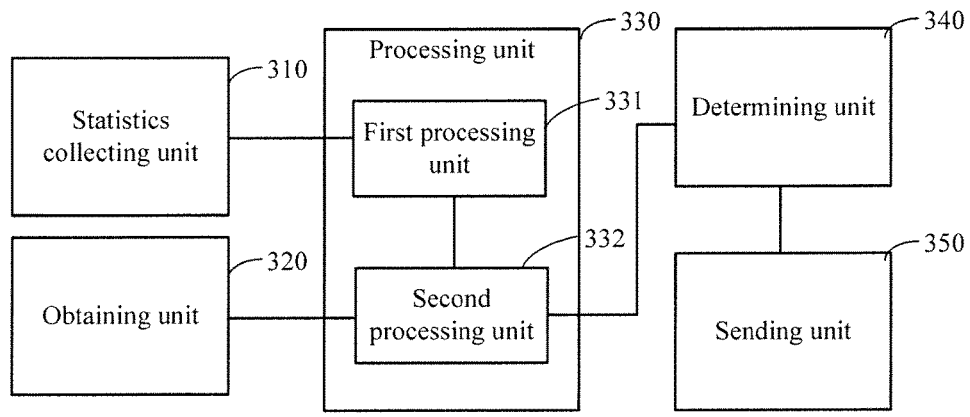
FIG. 3 is a schematic diagram of a network optimization apparatus according to an embodiment of the present invention.

Correspondingly, an embodiment of the present invention provides a network optimization apparatus, which is configured to implement the network optimization method provided by Embodiment 1. As shown in FIG. 3, the apparatus includes: a statistics collecting unit 310, an obtaining unit 320, a processing unit 330, a determining unit 340, and a sending unit 350.

The statistics collecting unit 310 is configured to collect statistics on a load index of a cell within a coverage area of the network optimization apparatus.

Specifically, the network optimization apparatus may be specifically implemented as a base station.

The statistics collecting unit 310 of the network optimization apparatus collects statistics on a load index of each cell separately within the coverage area. According to an LTE specification, a Load Ratio (LR) of the cell can be obtained through calculation by using the formula 1.

A quantity of PRBs occupied by a GBR service and an NGBR service may be a quantity of PRBs occupied by an uplink service or a downlink service, or may be a quantity of PRBs occupied by both an uplink service and a downlink service. Correspondingly, a quantity of available PRBs of the cell may be a quantity of available PRBs of an uplink or a downlink, or may be a quantity of available PRBs of both an uplink and a downlink. Two thresholds, a maximum load threshold $LR_{MAX}$ and a minimum load threshold $LR_{MIN}$, are defined. When $LR \leq LR_{MIN}$ indicates that the cell is in a low load state; $LR > LR_{MAX}$ indicates that the cell is in a high load state, and in this case, whether a system can provide access to more services depends on another load index, for example, a Dynamic Load Ratio (DLR); $LR_{MAX}$ indicates that the cell is in a normal load state.

In an LTE system, system resource usage features for the GBR service and the NGBR service are different. For the GBR service, the system needs to ensure that a corresponding service request resource is provided to enable normal running of the GBR service. If a system resource cannot meet a requirement of the GBR service, the GBR service is interrupted. The NGBR is a resilient service. The NGBR service can run normally provided that the system can provide a resource that meets a minimum service Quality of Experience (QoE) requirement of the NGBR service. The system may allocate more resources to the NGBR service according to an Aggregated Maximum Bit Rate (AMBR) condition if resources are sufficient, or the system may allocate fewer resources to the NGBR service if resources are insufficient. Therefore, a service load that needs to meet the requirement may be represented by defining a Dynamic Load Ratio (DLR). The DLR is obtained through calculation by using the formula 2.

Two thresholds, $DLR_{MAX}$ and $DLR_{MIN}$, are defined. $DLR \leq DLR_{MIN}$ indicates that the cell is in a low load state. $DLR > DLR_{MAX}$ indicates that the cell is in a high load state, and a system load has reached a critical state; in this case, a system capacity is basically saturated and the system is difficult to provide access to more services. When $LR > LR_{MAX}$ and $DLR \leq DLR_{MAX}$, the system is in the high load state, but the system load has not reached the critical state; therefore, the system may further provide access to more GBR services by decreasing an NGBR service ratio of an accessed user. $DLR_{MIN} < DLR \leq DLR_{MAX}$ indicates that the cell is in a normal load state.

Therefore, the load index, on which statistics are collected by the statistics collecting unit 310, of the cell may include two parameters: the LR and the DLR.

The obtaining unit 320 is configured to obtain a network key performance indicator of the cell.

Specifically, the Key Performance Indicator (KPI) of the cell includes parameters such as a Cell Average Efficiency (CAE) and a Cell Edge Load Ratio (CELR).

The Cell Average Efficiency (CAE) is a performance indicator representing a resource usage capability of the cell. In the LTE system, a different modulation and Modulation and Coding Scheme (MCS) is used for a different resource block according to channel quality of a scheduled user. A higher MCS used indicates higher usage efficiency of a resource block; otherwise, a lower MCS used indicates lower usage efficiency of a resource block. The CAE may be calculated by using the formula 3.

$CAE_{MIN}$ is a minimum cell average efficiency threshold. When $CAE \geq CAE_{MIN}$, it indicates that the cell average efficiency is in a normal range; when $CAE < CAE_{MIN}$, it indicates that the cell average efficiency is quite low and cell resource usage efficiency is low.

There are mainly two factors causing a decrease in the cell average efficiency. First, when the cell is strongly interfered, average channel quality of cell users is relatively poor, resulting in that the cell resource usage efficiency is not high. Second, when most users in the cell are located at the edge of the cell, average channel quality of cell users is also relatively poor, resulting in that the cell resource usage efficiency is not high. To distinguish the low cell average efficiency caused in the two cases, the CELR is defined and used to indicate a percentage that user services at the edge of the cell account for in services in the cell. The CELR is calculated by using the formula 4.

$CELR_{MAX}$ is a maximum cell edge load ratio threshold. When $CELR > CELR_{MAX}$, it indicates that there is a large quantity of user services at the edge of the cell. Received signals of these users are relatively low; therefore, service communication can be performed only by using a low order modulation and coding scheme, which directly results in low cell average efficiency. When $CELR \leq CELR_{MAX}$, it indicates that user services are relatively evenly distributed, which does not result in low cell average efficiency.

The processing unit 330 is configured to determine a load level of the cell according to the load index of the cell, and determine a performance status of the cell with reference to the network key performance indicator.

Specifically, the processing unit 330 specifically includes a first processing unit 331 and a second processing unit 332.

The first processing unit 331 is configured to: when the load ratio exceeds an upper threshold of the load ratio and the dynamic load ratio exceeds an upper threshold of the dynamic load ratio, determine that the load level of the cell is overload.

Specifically, the load level of the cell is determined according to the LR and the DLR. When $LR \geq LR_{MAX}$ $DLR \geq DLR_{MAX}$, the load level of the cell is overload.

The second processing unit 332 is configured to: determine the cell performance indicator according to the load index and the network key performance indicator of the cell, where the cell performance indicator includes a load feature parameter and a spectrum efficiency feature parameter of the cell; and determine the performance status of the cell according to the cell performance indicator.

A relationship between the load index and the network key performance indicator that are of the cell and the load feature parameter and the spectrum efficiency feature parameter that are of the cell is defined as shown in Table 1.

When $LR_{MIN} < LR \leq LR_{MAX}$ and $CAE \geq CAE_{MAX}$, it indicates that the cell works in a normal state; when $LR > LR_{MAX}$ and $DLR \leq DLR_{MAX}$, it indicates that the cell is in the high load state, but has not reached the critical load state; when $LR > LR_{MAX}$ and $DLR > DLR_{MAX}$, it indicates that the cell is in the critical load state; in this case, the system needs to decrease the cell load through optimization; when $CAE < CAE_{MIN}$ and $CELR \leq CELR_{MAX}$, it indicates that the cell average efficiency is low, and the main cause for an excessively low cell efficiency is interference; when $CAE < CAE_{MIN}$ and $CELR > CELR_{MAX}$, it indicates that the cell average efficiency is low, and the main cause for an excessively low cell efficiency is coverage; and the like.

In addition, with reference to Table 2, the performance status of the cell may be further determined according to the cell performance indicator, which is not described herein.

The determining unit 340 is configured to: when the load level of the cell is overload, determine a cause for overload of the cell according to the performance status of the cell.

Specifically, it can be known according to Table 2 that: when ID=7 (that is, a case in which a load feature in the cell performance indicator is determined as a critical load according to the load index of the cell), the cell is correspondingly in the high critical load state, and the critical load is mainly caused by an excessively high service requirement; when ID=8 (that is, a case in which a load feature in the cell performance indicator is determined as a critical load according to the load index of the cell and a spectrum efficiency feature of the cell is determined, according to the network key performance indicator of the cell, as low efficiency-interference limited), the cell is correspondingly in the critical load state, and the critical load is mainly caused by excessively high interference to the cell; when ID=9 (that is, a case in which a load feature in the cell performance indicator is determined as a critical load according to the load index of the cell and a spectrum efficiency feature of the cell is determined, according to the network key performance indicator of the cell, as low efficiency-noise limited), the cell is correspondingly in the critical load state, and the critical load is mainly caused by poor coverage of the cell.

The sending unit 350 is configured to send a message to a self-organized network SON entity, where the message carries an identifier that is used to indicate the cause for overload of the cell.

Specifically, the network optimization apparatus sends the message to the SON entity by using the sending unit 350, where the message carries the identifier that is used to indicate the cause for overload. In this case, the SON entity selects, according to the cause for overload obtained in the identifier, an appropriate optimization algorithm to optimize network performance. The SON entity is a logical entity and may exist in the base station or an independent controller.

In a specific example, when the cause for overload is interference, the SON entity triggers an Inter-Cell Interference Coordination (ICIC) optimization algorithm to optimize the network performance; when the cause for overload is coverage, the SON entity triggers a radio frequency signal (RF) optimization algorithm to optimize the network performance; when the cause for overload is an excessively high service requirement, the SON entity triggers an RF optimization algorithm and/or an LB optimization algorithm to optimize the network performance.

The sending unit in this embodiment may be a transmitter of the base station, or may be a transceiver integrating a receiving unit. The processing unit may be a separately disposed processor, or may be implemented in a processor of the base station by means of integration, or additionally may be stored in a memory of the base station in a form of program code, where a processor of the base station invokes the program code and executes functions of the processing unit. The determining unit is implemented in the same manner as the processing unit, and may be implemented independently or implemented together with the processing unit by means of integration. The processor herein may be a Central Processing Unit (CPU) or an Application Specific Integrated Circuit (ASIC), or may be configured as one or more integrated circuits that implement this embodiment of the present invention.

According to the network optimization apparatus provided by this embodiment of the present invention, whether a cell is overloaded is determined according to a load index of the cell, a performance status of the cell is identified with reference to a network key performance indicator, and a cause for overload of the cell is determined if a cell load is overload. Therefore, a network problem is quickly identified, and a SON entity is triggered to dynamically select an optimization policy according to the cause for overload, accurately and effectively resolving a cell overload problem.

Figure 4:
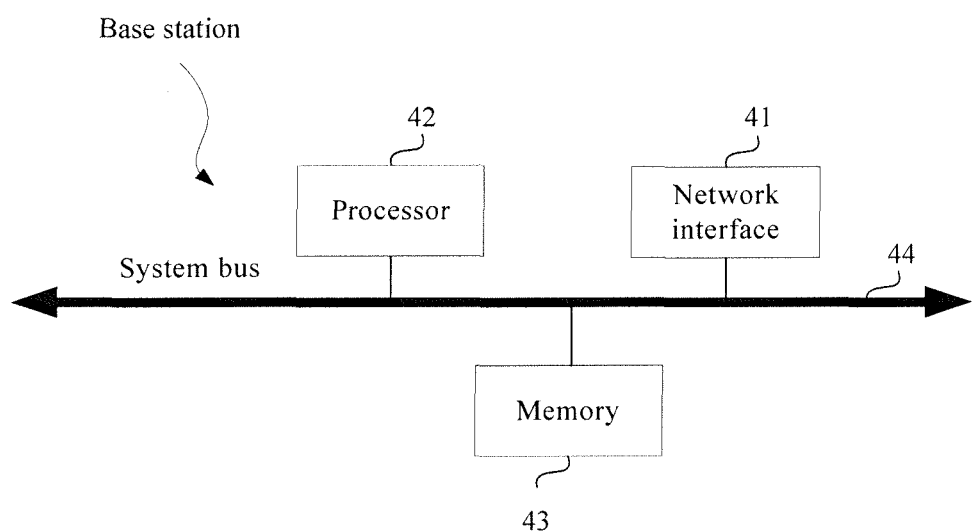
FIG. 4 is a schematic structural diagram of a base station according to an embodiment of the present invention.

Correspondingly, an embodiment of the present invention provides a base station, which is configured to implement the network optimization method provided by Embodiment 1. As shown in FIG. 4, the base station includes a network interface 41, a processor 42, and a memory 43. A system bus 44 is configured to connect the network interface 41, the processor 42, and the memory 43.

The network interface b 41 is configured to communicate with a terminal of the Internet of Things, an access gateway of the Internet of Things, a bearing network, a service gateway of the Internet of Things, and an application server.

The processor 42 is configured to execute an application program stored in the memory, and may be one processor or a general term of multiple processing elements. For example, the processor 42 may be a Central Processing Unit (CPU) or an Application Specific Integrated Circuit (ASIC), or may be configured as one or more integrated circuits that implement this embodiment of the present invention, such as one or more microprocessors (digital signal processor, DSP) or one or more field programmable gate arrays Field Programmable Gate Array (FPGA).

The memory 43 may be a storage apparatus or a general term of multiple storage elements, and is configured to store executable program code, parameters and data needed by the base station for running, or the like. The memory 43 may include a random-access memory (RAM), or may include a non-volatile memory (non-volatile memory), such as a disk memory, a flash memory (Flash), or the like.

The system bus 44 may be an Industry Standard Architecture (ISA) bus, a Peripheral Component interconnect (PCI) bus or an Extended Industry Standard Architecture (EISA) bus, or the like. The system bus 44 may be classified as an address bus, a data bus, a control bus, or the like. For ease of denotation, the bus is represented by using only one thick line in FIG. 4; however, it does not indicate that there is only one bus or only one type of bus.

Upon enabling, these software components are loaded into the memory 43, and are accessed by the processor 42 to execute the following instructions:

collecting statistics on a load index of a cell within a coverage area of the base station;

determining a load level of the cell according to the load index of the cell;

obtaining a network key performance indicator of the cell;

determining a performance status of the cell according to the load index and the network key performance indicator of the cell; and determining a cause for overload of the cell according to the performance status of the cell when the load level of the cell is overload.

The network interface 41 sends a message to a self-organized network SON entity, where the message carries an identifier that is used to indicate the cause for overload of the cell.

The load index of the cell specifically includes a load ratio and a dynamic load ratio, and an instruction that is in the application program and that may be used to enable the processor to execute the determining a load level of the cell according to the load index of the cell is:

when the load ratio exceeds an upper threshold of the load ratio and the dynamic load ratio exceeds an upper threshold of the dynamic load ratio, determining that the load level of the cell is overload.

The network key performance indicator includes a cell average efficiency CAE, which is used to indicate a resource usage capability of the cell; a manner of calculating the network key performance indicator is shown in the formula 3. The network key performance indicator also includes a cell edge load ratio CELR, which is used to indicate a percentage that user services at the edge of the cell account for in services in the cell; a manner of calculating the CELR is shown in the formula 4. Details are not described herein again.

Instructions that are in the application program and that may be used to enable the processor to execute the determining a performance status of the cell according to the load index and the network key performance indicator of the cell are: determining the cell performance indicator according to the load index and the network key performance indicator of the cell, where the cell performance indicator includes a load feature parameter and a spectrum efficiency feature parameter of the cell; and determining the performance status of the cell according to the cell performance indicator.

An instruction that is in the application program and that may be used to enable the processor to execute the determining a cause for overload of the cell according to the performance status of the cell when the load level of the cell is overload is:

determining the cause for overload of the cell according to the load feature parameter and the spectrum efficiency feature parameter of the cell.

According to the base station provided by this embodiment of the present invention, whether a cell is overloaded can be determined according to a load index of the cell, a performance status of the cell can be identified with reference to a network key performance indicator, and a cause for overload of the cell can be determined if a cell load is overload. Therefore, a network problem is quickly identified, and a SON entity is triggered to dynamically select an optimization policy according to the cause for overload, accurately and effectively resolving a cell overload problem.

A person skilled in the art may be further aware that, in combination with the examples described in the embodiments disclosed in this specification, units and algorithm steps may be implemented by electronic hardware. The foregoing description has generally described compositions and steps of each example according to functions. The person skilled in the art may use different methods to implement the described functions for each particular application, but it should not be considered that the implementation goes beyond the scope of the embodiments of the present invention. Specifically, the operation and control portions may both be implemented by using logical hardware, where the logical hardware may be a logical integrated circuit manufactured by using an integrated circuit technology, which is not limited in the embodiments of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objectives, technical solutions, and benefits of the embodiments of the present invention are further described in detail. It should be understood that the foregoing descriptions are merely specific implementation manners of the embodiments of the present invention, but are not intended to limit the protection scope of the embodiments of present invention. Any modification, equivalent replacement, or improvement made without departing from the spirit and principle of the embodiments of the present invention shall fall within the protection scope of the embodiments of the present invention.

What is claimed is:

1. A network optimization method, wherein the method comprises:

collecting statistics on a load index of a cell within a coverage area;

determining a load level of the cell according to the load index of the cell;

obtaining a network key performance indicator of the cell;

determining a performance status of the cell according to the load index and the network key performance indicator of the cell;

determining a cause for overload of the cell according to the performance status of the cell when the load level of the cell is overload; and sending a message to a self-organized network (SON) entity, wherein the message carries an identifier that is used to indicate the cause for overload of the cell;

wherein the network key performance indicator comprises a cell average efficiency (CAE), which is used to indicate a resource usage capability of the cell; and $$CAE = \frac{\sum_{n=1}^{N} MCS_n}{N * MCS_{max}},$$

wherein MCS is a modulation and coding scheme used for a resource block according to channel quality of a scheduled user; and N is a quantity of users within the cell.

2. The method according to claim 1, wherein the load index of the cell comprises a load ratio and a dynamic load ratio, and the determining a load level of the cell according to the load index of the cell comprises:

when the load ratio exceeds an upper threshold of the load ratio and the dynamic load ratio exceeds an upper threshold of the dynamic load ratio, determining that the load level of the cell is overload.

3. The method according to claim 1, wherein the determining a performance status of the cell according to the load index and the network key performance indicator of the cell comprises:

determining a cell performance indicator according to the load index and the network key performance indicator of the cell, wherein the cell performance indicator comprises a load feature parameter and a spectrum efficiency feature parameter of the cell; and determining the performance status of the cell according to the cell performance indicator.

4. The method according to claim 3, wherein the determining a cause for overload of the cell according to the performance status of the cell when the load level of the cell is overload comprises:

determining the cause for overload of the cell according to the load feature parameter and the spectrum efficiency feature parameter of the cell.

5. The method according to claim 1, wherein the network key performance indicator comprises a cell edge load ratio (CELR), which is used to indicate a percentage that user services at the edge of the cell over account for in services in the cell; and $$CELR = \frac{\text{Load of a user that satisfies an } A2 \text{ event}}{\text{Loads of all users}},$$

wherein the user that satisfies an A2 event is a user receiving a base station signal whose strength is lower than a specified threshold.

6. A base station, wherein the base station comprises:

a memory comprising instructions; and one or more processors in communication with the memory, wherein the one or more processors execute the instructions to:

collect statistics on a load index of a cell within a coverage area;

determine a load level of the cell according to the load index of the cell;

obtain a network key performance indicator of the cell;

determine a performance status of the cell according to the load index and the network key performance indicator of the cell;

determine a cause for overload of the cell according to the performance status of the cell when the load level of the cell is overload; and a network interface, configured to send a message to a self-organized network SON entity, wherein the message carries an identifier that is used to indicate the cause for overload of the cell;

wherein the network key performance indicator comprises a cell average efficiency (CAE), which is used to indicate a resource usage capability of the cell; and $$CAE = \frac{\sum_{n=1}^{N} MCS_n}{N * MCS_{max}},$$

wherein MCS is a modulation and coding scheme used for a resource block according to channel quality of a scheduled user; and N is a quantity of users within the cell.

7. The base station according to claim 6, wherein the load index of the cell comprises a load ratio and a dynamic load ratio; and the one or more processors execute the instructions to determine a load level of the cell according to the load index of the cell is:

when the load ratio exceeds an upper threshold of the load ratio and the dynamic load ratio exceeds an upper threshold of the dynamic load ratio, determine that the load level of the cell is overload.

8. The base station according to claim 6, wherein the one or more processors execute the instructions to determine a performance status of the cell according to the load index and the network key performance indicator of the cell comprises:

determine the cell performance indicator according to the load index and the network key performance indicator of the cell, wherein the cell performance indicator comprises a load feature parameter and a spectrum efficiency feature parameter of the cell; and determine the performance status of the cell according to the cell performance indicator.

9. The base station according to claim 8, wherein when the load level of the cell is overload, the one or more processors execute the instructions to:

determine the cause for overload of the cell according to the load feature parameter and the spectrum efficiency feature parameter of the cell.

10. The base station according to claim 6, wherein the network key performance indicator comprises a cell edge load ratio (CELR), which is used to indicate a percentage that user services at the edge of the cell account for in services in the cell; and $$CELR = \frac{\text{Load of a user that satisfies an } A2 \text{ event}}{\text{Loads of all users}},$$

wherein the user that satisfies an A2 event is a user receiving a base station signal whose strength is lower than a specified threshold.

* * * * *